United States Patent Office 2,730,523
Patented Jan. 10, 1956

2,730,523

5-NITROTHIAZOLEAZO-N-FLUOROALKYL-ANILINE COMPOUNDS

Joseph B. Dickey and Edmund B. Towne, Kingsport, Tenn., assignors to Eastman Kodak Company, Rochester, N. Y., a corporation of New Jersey No Drawing. Application August 16, 1952,
Serial No. 304,837

9 Claims. (Cl. 260—158)

This invention relates to new azo compounds and their application to the art of dyeing or coloring.

We have discovered that the azo compounds having the general formula:

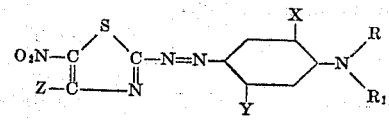

wherein R represents a hydrogen atom, an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 2 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms or a (—CH$_2$)$_n$—COOR$_2$ group wherein n is 1, 2 or 3 and R$_2$ represents an alkyl group having 1 to 4, inclusive, carbon atoms, R$_1$ represents a 2,2-difluoroethyl group, a 3,3-difluoropropyl group, a 2,2-difluoro-n-propyl group, a 3,3- difluoro-n-butyl group, a 4,4-difluoro-n-amyl group, a 2,2,2-trifluoroethyl group, a 3,3,3-trifluoropropyl group or a 4,4,4-trifluoro-butyl group, X represents a hydrogen atom, an alkyl group having 1 to 2, inclusive, carbon atoms, an alkoxy group having 1 to 2, inclusive, carbon atoms, a bromine atom or a chlorine atom, Y represents a hydrogen atom, an alkyl group having 1 to 2, inclusive, carbon atoms, an alkoxy group having 1 to 2, inclusive, carbon atoms, a bromine atom, a chlorine atom, an acetylamino group, a propionylamino group or a butyrylamino group and Z represents a hydrogen atom, an unsubstituted alkyl group having 1 to 6, inclusive, carbon atoms, a cyano group, a trifluoromethyl group or a

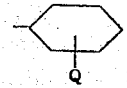

group, wherein Q represents a hydrogen atom, a nitro group, a chlorine atom, a bromine atom, a fluorine atom or an alkyl group having 1 to 4, inclusive, carbon atoms, are valuable dyes for coloring textile materials made of or containing a cellulose alkyl carboxylic acid ester having 2 to 4 carbon atoms in the acid groups thereof. They are especially of use for the coloration of cellulose acetate textile materials. When applied to the aforesaid textile materials, they give, for example, violet, reddish-violet, red, violet-blue, blue and blue-green dyeings which, in general, have good fastness to light, excellent fastness to gas, good dischargeability, good wash fastness and good fastness to crocking. Other valuable features of these dye compounds are their level dyeing and depth and brightness of shade on cellulose acetate textile materials. The compounds of our invention also color wool, silk, nylon, polyethylene terephthalate and modified polyacrylonitrile textile materials similar colors but do not appear to be as good dyes for these latter materials as they are for cellulose acetate.

It is an object of our invention to provide new azo compounds. Another object is to provide a satisfactory process for the preparation of our new azo compounds. A further object is to provide dyed textile materials, especially cellulose acetate textile materials, which have good fastness to light and gas.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo compounds of our invention are prepared by diazotizing a 2-amino-5-nitrothiazole having the formula:

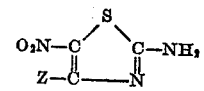

and coupling the diazonium compound obtained with a compound having the formula:

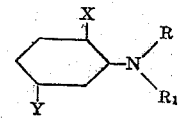

R, R$_1$, X, Y and Z in the foregoing formulas have the meaning previously assigned to them.

Typical of the 2-amino-5-nitrothiazole compounds used in the preparation of the azo compounds of our invention are: 2 - amino - 5 - nitrothiazole, 2 - amino - 4 - methyl-5 - nitrothiazole, 2 - amino - 4 - ethyl - 5 - nitrothiazole, 2 - amino - 4 - n - butyl - 5 - nitrothiazole, 2 - amino - 4 - n - hexyl - 5 - nitrothiazole, 2 - amino - 4 - cyano - 5 - nitrothiazole, 2 - amino - 4 - trifluoromethyl - 5 - nitro - thiazole, 2 - amino - 4 - phenyl - 5 - nitrothiazole, 2 - amino - 4 - (o - nitrophenyl) - 5 - nitrothiazole, 2 - amino - 4 - (m - nitrophenyl) - 5 - nitrothiazole, 2 - amino - 4 - (p - nitrophenyl) - 5 - nitrothiazole, 2 - amino - 4 - (p - chlorophenyl) - 5 - nitrothiazole, 2 - amino - 4 - (o - bromophenyl) - 5 - nitrothiazole, 2 - amino - 4 - (o - fluorophenyl) - 5 - nitrothiazole, 2 - amino - 4 - (o - chlorophenyl ) - 5 - nitrothiazole, 2 - amino - 4 - (p - fluorophenyl) - 5 - nitrothiazole, 2 - amino - 4 - (o - methylphenyl) - 5 - nitrothiazole, 2 - amino - 4 - (p - methylphenyl) - 5 - nitrothiazole and 2 - amino - 4 - (p - n - butylphenyl) - 5 - nitrothiazole. The use of 2 - amino - 5 - nitrothiazole is ordinarily preferred.

Illustrative of the alkyl groups represented by R are the methyl, the ethyl, the n-propyl, the isopropyl, the n-butyl, the n-amyl, the n-hexyl, the n-heptyl, the n-octyl, the n-nonyl and the n-decyl groups. Illustrative of the alkoxyalkyl groups represented by R are the β-methoxyethyl, β-ethoxyethyl, β-n-propoxyethyl, β-n-butoxyethyl, the γ-n-propoxypropyl, the 2,3-dimethoxypropyl, the 3-methoxy-2-hydroxypropyl and the 3-methoxy-2-methyl-2-hydroxypropyl groups. Similarly, the β-hydroxyethyl, the β-hydroxypropyl, the γ-hydroxypropyl, the β,γ-dihydroxypropyl, the β-methyl-β,γ-dihydroxypropyl, the δ-hydroxybutyl, the ε-hydroxyamyl and the δ,ε-dihydroxyamyl groups are illustrative of the hydroxyalkyl groups R represents. Illustrative of the cyanoalkyl groups R represents are the β-cyanoethyl, the γ-cyanopropyl, the δ-cyanobutyl and the ε-cyanopentyl groups.

Sulfoalkyl groups represented by R include, for example, the β-sulfoethyl, the γ-sulfopropyl and the δ-sulfobutyl groups. Sulfatoalkyl groups represented by R include, for example, the β-sulfatoethyl, the β-sulfaton-propyl, the γ-sulfatopropyl, sulfated β,γ-dihydroxypropyl, the δ-sulfatobutyl and the ε-sulfoamyl groups. Illustrative phosphatoalkyl groups represented by R are the β-phosphatoethyl group, the γ-phosphatopropyl group, the δ-phosphatobutyl group and the ε-phosphatoamyl groups. Phosphonoalkyl groups represented by R include, for example, the β-phosphonoethyl, the γ-phosphonopropyl, the δ-phosphonobutyl and the ε-phosphonoamyl groups. Illustrative of the $(-CH_2)_n-COOR_2$ groups R represents are the $-CH_2COOCH_3$, the $-CH_2COOC_2H_5$, the $-CH_2COOCH_2CH_2CH_2CH_3$, the $-CH_2CH_2COOCH_3$, the $-CH_2CH_2COOC_2H_5$, the $-CH_2CH_2COOCH_2CH_2CH_2CH_3$, the $-CH_2CH_2CH_2COOCH_3$ the $-CH_2CH_2CH_2COOC_2H_5$ and the $-CH_2CH_2CH_2COOCH_2CH_2CH_2CH_3$ groups.

Similarly the methyl, the ethyl, the n-propyl, the isopropyl, the n-butyl, the n-amyl and the n-hexyl groups are illustrative of the alkyl groups Z represents.

The azo compounds of our invention yield bluer dyes than are obtained when the known diazonium compounds such as, for example, p-nitroaniline, o-chloro-p-nitroaniline, 1-amino-2-methylsulfone-4-nitrobenzene and 1-amino-2-N-ethylsulfonamide-4,6-dinitrobenzene are coupled with the same N-fluoroalkylaniline coupling components as the diazotized 2-amino-5-nitrothiazole compounds of our invention. Thus, as shown hereinafter, the azo compounds of our invention yield much bluer dyeings on cellulose acetate than the corresponding dyes obtained from diazotized 1-amino-2-N-ethylsulfonamide-4,6-dinitrobenzene which has, up to now, given the bluest dyes of practical value for cellulose acetate.

were added while keeping the temperature of the reaction mixture at 0° C.–5° C. The reaction mixture thus obtained was then stirred at about 0° C.–5° C. for three hours and excess sodium nitrite present in the mixture was destroyed by adding one to two grams of urea. A clear diazonium solution was obtained.

C. Coupling 10 cc. of the 2-amino-5-nitrothiazole diazonium solution prepared as described in B above were added, with stirring, at 0° C.–5° C. to a solution of 0.97 gram of N-β-hydroxyethyl-N-3,3-difluorobutyl-m-toluidine in 10 cc. of a 1:6 mixture of propionic-acetic acid (i. e. 1 part by volume of propionic acid to 6 parts by volume of acetic acid). After a short time, the reaction mixture was made neutral to Congo paper by adding sodium acetate portionwise and the coupling reaction was allowed to proceed for three hours. The reaction mixture was then poured into cold water (15° C.) and after stirring a short time, it was filtered to recover the dye compound formed on the filter. The dye compound thus obtained was washed well with water and dried. 1.10 grams of the dye compound having the formula:

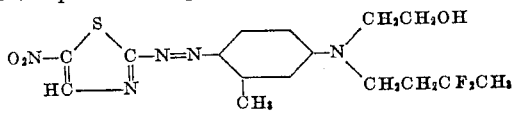

were obtained. This compound dyes cellulose acetate textile materials deep, bright blue shades having excellent fastness to gas and fairly good light fastness. This compound has excellent affinity for cellulose acetate fabrics. Its dyeings on cellulose acetate textile materials are dischargeable to a sharp, white print. The compound of

| Coupling Component | Diazo component | |
|---|---|---|
| | Diazonium form of  Color | Diazonium form of  Color |
| N-2,2,2-trifluoroethyl-N-β-hydroxyethylaniline | yellowish-orange | violet-pink. |
| N-2,2-difluoroethyl-N-β-hydroxyethylaniline | orange | violet-red. |
| N-3,3,3-difluoropropyl-N-β-hydroxyethylaniline | red | bluish-violet. |
| N-3,3-difluoropropyl-N-β-hydroxyethyl-m-toluidine | wine color | blue. |
| N-3,3-difluoro-butyl-N-β-hydroxyethyl-m-toluidine | violet | Do. |

The following examples illustrate the azo compounds of our invention and their manner of preparation:

EXAMPLE 1

A. Preparation of nitrosyl sulfuric acid 1.52 grams of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture of 3 cc. of propionic acid and 17 cc. of acetic acid were added dropwise, with stirring, while allowing the temperature to rise to 15° C. and maintaining it at this temperature during the remainder of the addition.

B. Diazotization

The nitrosyl sulfuric acid mixture prepared as described above was cooled to 0° C.–5° C. and then 2.9 grams (0.02 mole) of 2-amino-5-nitrothiazole were added portionwise, while stirring, after which 20 cc. of a propionic-acetic acid mixture prepared as described above this example also dyes wool, nylon, silk and polyethylene terephthalate textile materials deep shades of blue.

EXAMPLE 2

0.97 gram of N-β-hydroxyethyl-N-4,4-difluoropentyl-aniline in 10 cc. of a 1:6 mixture of propionic-acetic acid was added dropwise at 0° C. to 10 cc. of the 2-amino-5-nitrothiazole diazonium solution prepared as described in B of Example 1. After a short time, the reaction mixture was made neutral to Congo paper by adding sodium acetate portionwise and the coupling reaction was allowed to proceed at 0° C.–20° C. for two hours, after which the dye compound formed was precipitated by pouring the reaction mixture into 200 cc. of cold water. The reaction mixture thus obtained was filtered to recover the dye compound formed on the filter. The dye compound thus obtained was washed well with water and dried. 1.14 grams of a dye which colors cellulose acetate textile materials deep, dark blue shades which have excellent fastness to gas and good fastness to light were obtained as a dark powder. The dye compound has excellent affinity for cellulose acetate textile materials and dyes such materials well at lower temperatures such as room temperature. The cellulose acetate dyeings discharge to sharp and white prints.

EXAMPLE 3

10 cc. of the 2-amino-5-nitrothiazole diazonium solution prepared as described in B of Example 1 were added, with stirring, at 3° C. to a solution of 0.92 gram of N-β-hydroxyethyl-N-3,3-difluoropropyl-m-toluidine in 10 cc. of a 1:6 mixture of propionic-acetic acid. Upon working up the reaction mixture in accordance with the procedure described in Example 1, 1.16 grams of a dye which colors cellulose acetate textile materials deep blue shades were obtained. The fastness properties are about the same as the dye of Example 1.

EXAMPLE 4

By the use of 1 gram of N-β-hydroxyethyl-N-3,3-difluoropropyl-m-chloroaniline in place of N-β-hydroxyethyl-N-3,3-difluorobutyl-m-toluidine in Example 1, 1.3 grams of a dye compound which colors cellulose acetate textile materials deep violet-blue shades having excellent fastness to gas and light are obtained as a dark powder.

EXAMPLE 5

0.58 gram of 2-amino-5-nitrothiazole was diazotized and the diazonium compound obtained was coupled with 0.86 gram of N-β-hydroxyethyl-N-2,2-difluoroethyl-m-toluidine. Diazotization, coupling and recovery of the dye compound formed were carried out in accordance with the general procedure described in Example 1. 0.9 gram of a dye compound which colors cellulose acetate textile materials deep violet shades was obtained as a dark powder.

EXAMPLE 6

0.58 gram of 2-amino-5-nitrothiazole was diazotized and the diazonium compound obtained was coupled with 0.93 gram of N-β-hydroxyethyl-N-2,2,2-trifluoroethyl-m-toluidine. Diazotization, coupling and recovery of the dye compound formed were carried out in accordance with the general procedure described in Example 1. 0.89 gram of a dye compound which colors cellulose acetate textile materials deep red-violet shades having excellent fastness to gas and light was obtained.

EXAMPLE 7

0.58 gram of 2-amino-5-nitrothiazole was diazotized and the diazonium compound obtained was coupled with 1.03 grams of N-β-hydroxyethyl-N-4,4-difluoroamyl-m-toluidine. Diazotization, coupling and recovery of the dye compound formed were carried out in accordance with the general procedure described in Example 1. 0.66 gram of a dye compound which colors cellulose acetate textile materials bright blue-green shades was obtained.

EXAMPLE 8

0.58 gram of 2-amino-5-nitrothiazole was diazotized and the diazonium compound obtained was coupled with 0.86 gram of N-β-hydroxyethyl-N-3,3-difluoropropyl-aniline. Diazotization, coupling and recovery of the dye compound formed were carried out in accordance with the general procedure described in Example 1. 1.04 grams of a dye compound which colors cellulose acetate textile materials deep blue shades which are slightly on the violet side were obtained as a dark powder.

EXAMPLE 9

0.58 gram of 2-amino-5-nitrothiazole was diazotized and the diazonium compound obtained was coupled with 1.05 grams of N-β-hydroxyethyl-N-3,3-difluorobutyl-m-chloroaniline. Diazotization, coupling and recovery of the dye compound formed were carried out in accordance with the general procedure described in Example 1. 1.14 grams of a dye compound which colors cellulose acetate textile materials bright violet shades were obtained.

EXAMPLE 10

0.58 gram of 2-amino-5-nitrothiazole was diazotized and the diazonium compound obtained was coupled with 0.76 gram of N-β-hydroxyethyl-N-2,2-difluoroethylaniline. Diazotization, coupling and recovery of the dye compound formed were carried out in accordance with the general procedure described in Example 1. 0.83 gram of a dye compound which colors cellulose acetate textile materials reddish-violet shades was obtained as a dark powder.

EXAMPLE 11

0.58 gram of 2-amino-5-nitrothiazole was diazotized and the diazonium compound obtained was coupled with 0.88 gram of N-β-hydroxyethyl-N-2,2,2-trifluoroethyl-aniline. Diazotization, coupling and recovery of the dye compound formed were carried out in accordance with the general procedure described in Example 1. 0.87 gram of a dye compound which colors cellulose acetate textile materials red shades was obtained.

EXAMPLE 12

0.58 gram of 2-amino-5-nitrothiazole was diazotized and the diazonium compound obtained was coupled with 0.98 gram of N-β-hydroxyethyl-N-2,2-difluoroethyl-m-acetylaminoaniline. Diazotization, coupling and recovery of the dye compound formed were carried out in accordance with the general procedure described in Example 1. 0.64 gram of a dye compound which colors cellulose acetate textile materials deep violet shades was obtained as a dark powder.

EXAMPLE 13

1.33 grams of 2-amino-4-(m-nitrophenyl)-5-nitrothiazole were diazotized and the diazonium compound obtained was coupled with 1.25 grams of N-β-hydroxyethyl-N-3,3-difluoropropyl-m-chloroaniline. Diazotization, coupling and recovery of the dye compound formed were carried out in accordance with the general procedure described in Example 1. 1.58 grams of a dye compound which colors cellulose acetate textile materials light blue shades were obtained.

EXAMPLE 14

1.33 grams of 2-amino-4-(m-nitrophenyl)-5-nitrothiazole were diazotized and the diazonium compound obtained was coupled with 1.22 grams of N-β-hydroxyethyl-N-3,3-difluoro-n-butyl-m-toluidine. Diazotization, coupling and recovery of the dye compound formed were carried out in accordance with the general procedure described in Example 1. 1.68 grams of a dye compound which colors cellulose acetate textile materials bright blue shades were obtained.

EXAMPLE 15

1.33 grams of 2-amino-4-(m-nitrophenyl)-5-nitrothiazole were diazotized and the diazonium compound obtained was coupled with 1.17 grams of N-β-hydroxyethyl-N-2,2,2-trifluoroethyl-m-toluidine. Diazotization, coupling and recovery of the dye compound formed were carried out in accordance with the general procedure described in Example 1. 1.52 grams of a dye compound which colors cellulose acetate textile materials reddish-violet shades were obtained.

EXAMPLE 16

1.33 grams of 2-amino-4-(m-nitrophenyl)-5-nitrothiazole were diazotized and the diazonium compound obtained was coupled with 1.08 grams of N-β-hydroxyethyl-N-2,2-difluoroethyl-m-toluidine. Diazotization, coupling and recovery of the dye compound formed were carried out in accordance with the general procedure described in Example 1. 1.47 grams of a dye compound which colors cellulose acetate textile materials reddish-violet shades were obtained.

EXAMPLE 17

1.06 grams of 2-amino-4-trifluoromethyl-5-nitrothiazole were diazotized and the diazonium compound obtained was coupled with 1.15 grams of N-β-hydroxyethyl-N-3,3-difluoropropyl-m-toluidine. Diazotization, coupling and recovery of the dye compound formed were carried out in accordance with the general procedure described in Example 1. 1.23 grams of a dye compound which colors cellulose acetate textile materials blue shades were obtained.

EXAMPLE 18

1.06 grams of 2-amino-4-trifluoromethyl-5-nitrothiazole were diazotized and the diazonium compound obtained was coupled with 1.08 grams of N-β-hydroxyethyl-N-2,2-difluoroethyl-m-toluidine. Diazotization, coupling and recovery of the dye compound formed were carried out in accordance with the general procedure described in Example 1. 1.1 grams of a dye compound which colors cellulose acetate textile materials violet shades were obtained as a dark blue powder.

EXAMPLE 19

1.70 grams of 2-amino-4-cyano-5-nitrothiazole were diazotized and the diazonium compound obtained was coupled with 2.73 grams of N-β,γ-dihydroxypropyl-N-3,3-difluoro-n-butyl-m-toluidine. Diazotization, coupling and recovery of the dye compound formed were carried out in accordance with the general procedure described in Example 1. The dye compound obtained colors cellulose acetate textile materials blue shades.

EXAMPLE 20

1.59 grams of 2-amino-4-methyl-5-nitrothiazole were diazotized and the diazonium compound obtained was coupled with 2.75 grams of N-β,γ-dihydroxypropyl-N-2,2-difluoroethyl-2-methoxy-5-methylaniline. Diazotization, coupling and recovery of the dye compound formed were carried out in accordance with the general procedure described in Example 1. The dye compound obtained colors cellulose acetate textile materials blue-violet shades.

EXAMPLE 21

1.73 grams of 2-amino-4-ethyl-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials reddish-violet shades.

By the use of 2.36 grams of N-β-hydroxyethyl-N-2,2-difluoroethyl-m-chloroaniline in the above example, a dye compound is obtained which colors cellulose acetate textile materials red shades.

EXAMPLE 22

2.01 grams of 2-amino-4-n-butyl-5-nitrothiazole were diazotized and the diazonium compound obtained was coupled with 2.11 grams of N-β,γ-dihydroxypropyl-N-2,2-difluoroethylaniline. Diazotization, coupling and recovery of the dye compound formed were carried out in accordance with the general procedure described in Example 1. The dye compound obtained colors cellulose acetate textile materials reddish-violet shades.

By the use of 2.25 grams of N-β,γ-dihydroxypropyl-N-2,2-difluoroethyl-m-toluidine in the above example, a dye compound is obtained which colors cellulose acetate textile materials violet shades.

EXAMPLE 23

2.29 grams of 2-amino-4-n-hexyl-5-nitrothiazole were diazotized and the diazonium compound obtained was coupled with 2.19 grams of N-β-hydroxyethyl-N-2,2,2-trifluoroethylaniline. Diazotization, coupling and recovery of the dye compound formed were carried out in accordance with the general procedure described in Example 1. The dye compound obtained colors cellulose acetate textile materials red shades.

By the use of 2.47 grams of N-β-hydroxyethyl-N-4,4,4-trifluorobutylaniline in the above example, a dye compound is obtained which colors cellulose acetate textile materials violet shades.

EXAMPLE 24

1.70 grams of 2-amino-4-cyano-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials violet-blue shades.

By the use of 2.36 grams of N-β-hydroxyethyl-N-2,2-difluoroethyl-m-chloroaniline in the above example, a dye compound is obtained which colors cellulose acetate textile materials violet shades.

EXAMPLE 25

2.13 grams of 2-amino-4-trifluoromethyl-5-nitrothiazole were diazotized and the diazonium compound obtained was coupled with 2.25 grams of N-β-hydroxypropyl-N-2,2-difluoroethylaniline. Diazotization coupling and recovery of the dye compound formed were carried out in accordance with the general procedure described in Example 1. The dye compound obtained colors cellulose acetate textile materials reddish-violet shades.

By the use of 2.66 grams of N-β,γ-dihydroxypropyl-N-2,2-difluoroethyl-m-chloroaniline in the above example, a dye compound is obtained which colors cellulose acetate textile materials red shades.

EXAMPLE 26

2.21 grams of 2-amino-4-phenyl-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials reddish-blue shades.

By the use of 2.45 grams of N-β,γ-dihydroxypropyl-N-2,2-difluoroethyl-m-toluidine in the above example, a dye compound is obtained which colors cellulose acetate textile materials reddish-blue shades.

EXAMPLE 27

2.66 grams of 2-amino-4-(o-nitrophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials blue shades.

By the use of 2.80 grams of N-β-hydroxyethyl-N-2,2-difluoroethyl-m-bromoaniline in the above example, a dye compound is obtained which colors cellulose acetate textile materials blue shades.

EXAMPLE 28

2.66 grams of 2-amino-4-(m-nitrophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials blue shades.

By the use of 2.15 grams of N-β-hydroxyethyl-N-2,2-difluoro-n-propylaniline in the above example, a dye

EXAMPLE 29

2.66 grams of 2-amino-4-(p-nitrophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials blue shades.

By the use of 2.15 grams of N-γ-hydroxypropyl-N-2,2-difluoroethylaniline in the above example, a dye compound is obtained which colors cellulose acetate textile materials blue shades.

EXAMPLE 30

2.55 grams of 2-amino-4-(p-chlorophenyl)-5-nitrothiazole were diazotized and the diazonium compound obtained was coupled with 2.19 grams of N-β-hydroxyethyl-N-2,2-trifluoroethylaniline. Diazotization, coupling and recovery of the dye compound formed were carried out in accordance with the general procedure described in Example 1. The dye compound obtained colors cellulose acetate textile materials violet shades.

By the use of 2.33 grams of N-β-hydroxyethyl-N-2,2,2-trifluoroethyl-m-toluidine in the above example, a dye compound is obtained which colors cellulose acetate textile materials violet shades.

EXAMPLE 31

2.99 grams of 2-amino-4-(o-bromophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 2.15 grams of N-β-hydroxyethyl-N-3,3-difluoropropylaniline in the above example, a dye compound is obtained which colors cellulose acetate textile materials violet-blue shades.

EXAMPLE 32

2.39 grams of 2-amino-4-(o-fluorophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 2.29 grams of N-β-hydroxyethyl-N-3,3-difluoro-n-butylaniline in the above example, a dye compound is obtained which colors cellulose acetate textile materials violet shades.

EXAMPLE 33

2.55 grams of 2-amino-4-(o-fluorophenyl)-5-nitrothiazole were diazotized and the diazonium compound obtained was coupled with 2.19 grams of N-β-hydroxyethyl-N-2,2,2-trifluoroethylaniline. Diazotization, coupling and recovery of the dye compound formed were carried out in accordance with the general procedure described in Example 1. The dye compound obtained colors cellulose acetate textile materials violet shades.

By the use of 2.47 grams of N-β-hydroxyethyl-N-3,3,3-trifluoropropyl-m-toluidine in the above example, a dye compound is obtained which colors cellulose acetate textile materials violet-blue shades.

EXAMPLE 34

2.39 grams of 2-amino-4-(p-fluorophenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 2.31 grams of N-β-γ-dihydroxypropyl-N,2,2-difluoroethylaniline in the above example, a dye compound is obtained which colors cellulose acetate textile materials violet shades.

EXAMPLE 35

2.35 grams of 2-amino-4-(o-methylphenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials reddish-blue shades.

By the use of 2.36 grams of N-β-hydroxyethyl-N-2,2-difluoroethyl-m-chloroaniline in the above example, a dye compound is obtained which colors cellulose acetate textile materials violet shades.

EXAMPLE 36

2.35 grams of 2-amino-4-(p-methylphenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials reddish-blue shades.

By the use of 2.29 grams of N-β-hydroxyethyl-N-3,3-difluoropropyl-m-toluidine in the above example, a dye compound is obtained which colors cellulose acetate textile materials reddish-blue shades.

EXAMPLE 37

2.77 grams of 2-amino-4-(p-n-butylphenyl)-5-nitrothiazole were diazotized and the diazonium compound obtained was coupled with 2.01 grams of N-β-hydroxyethyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 2.58 grams of N-β-hydroxyethyl-N-2,2-difluoroethyl-m-acetylaminoaniline in the above example, a dye compound is obtained which colors cellulose acetate textile materials blue shades.

EXAMPLE 38

1.45 grams of 2-amino-5-nitrothiazole were diazotized and the diazonium compound obtained was coupled with 2.65 grams of N-β-sulfoethyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 3.07 grams of N-δ-sulfobutyl-N-2,2-difluoroethyl-m-toluidine in the above example, a dye compound is obtained which colors cellulose acetate textile materials violet shades.

EXAMPLE 39

1.45 grams of 2-amino-5-nitrothiazole were diazotized and the diazonium compound obtained was coupled with 3.13 grams of N-β-sulfatoethyl-N-2,2,2-trifluoroethyl-m-toluidine. Diazotization, coupling and recovery of the dye compound formed were carried out in accordance with the general procedure described in Example 1.

The dye compound obtained colors cellulose acetate textile materials reddish-violet shades.

By the use of 3.27 grams of N-γ-sulfatopropyl-N-2,2,2-trifluoroethyl-m-toluidine in the above example, a dye compound is obtained which colors cellulose acetate textile materials reddish-violet shades.

EXAMPLE 40

1.45 grams of 2-amino-5-nitrothiazole were diazotized and the diazonium compound obtained was coupled with 3.09 grams of N-δ-sulfatobutyl-N-2,2-difluoroethylaniline. Diazotization, coupling and recovery of the dye compound formed were carried out in accordance with the general procedure described in Example 1. The dye compound obtained colors cellulose acetate textile materials violet shades.

By the use of 3.23 grams of N-ε-sulfatoamyl-N-2,2-difluoroethylaniline in the above example, a dye compound is obtained which colors cellulose acetate textile materials violet shades.

EXAMPLE 41

1.45 grams of 2-amino-5-nitrothiazole were diazotized and the diazonium compound obtained was coupled with 2.95 grams of N-β-phosphatoethyl-N-2,2-difluoroethyl-m-toluidine. Diazotization, coupling and recovery of the dye compound formed were carried out in accordance with the general procedure described in Example 1. The dye compound obtained colors cellulose acetate textile materials violet shades.

By the use of 3.09 grams of N-γ-phosphatopropyl-N-2,2-difluoroethyl-m-toluidine in the above example, a dye compound is obtained which colors cellulose acetate textile materials violet shades.

EXAMPLE 42

1.45 grams of 2-amino-5-nitrothiazole were diazotized and the diazonium compound obtained was coupled with 3.27 grams of N-δ-phosphatobutyl-N-2,2,2-trifluoroethylaniline. Diazotization, coupling and recovery of the dye compound formed were carried out in accordance with the general procedure described in Example 1. The dye compound obtained colors cellulose acetate textile materials reddish-violet shades.

By the use of 3.55 grams of N-ε-phosphatoamyl-N-3,3,3-trifluoropropylaniline in the above example, a dye compound is obtained which colors cellulose acetate textile materials reddish-blue shades.

EXAMPLE 43

1.45 grams of 2-amino-5-nitrothiazole were diazotized and the diazonium compound obtained was coupled with 2.99 grams of N-β-phosphonoethyl-N-2,2-difluoroethyl-m-chloroaniline. Diazotization, coupling and recovery of the dye compound formed were carried out in accordance with the general procedure described in Example 1. The dye compound obtained colors cellulose acetate textile materials red shades.

By the use of 3.07 grams of N-ε-phosphonoamyl-N-2,2-difluoroethylaniline in the above example, a dye compound is obtained which colors cellulose acetate textile materials violet shades.

EXAMPLE 44

1.45 grams of 2-amino-5-nitrothiazole were diazotized and the diazonium compound obtained was coupled with 2.43 grams of N-CH₂COOCH₃-N-2,2-difluoroethyl-m-toluidine. Diazotization, coupling and recovery of the dye compound formed were carried out in accordance with the general procedure described in Example 1. The dye compound obtained colors cellulose acetate textile materials red shades.

By the use of 2.71 grams of N-CH₂COOC₂H₅-N-2,2-difluoro-n-propyl-m-toluidine in the above example, a dye compound is obtained which colors cellulose acetate textile materials red shades.

EXAMPLE 45

1.45 grams of 2-amino-5-nitrothiazole were diazotized and the diazonium compound obtained was coupled with 2.71 grams of N-CH₂COOCH₂CH₂CH₂CH₃-N-2,2-difluoroethylaniline. Diazotization, coupling and recovery of the dye compound formed were carried out in accordance with the general procedure described in Example 1. The dye compound obtained colors cellulose acetate textile materials red shades.

By the use of 2.99 grams of

N-CH₂CH₂COOCH₂CH₂CH₂CH₃-N-
2,2-difluoroethyl-m-toluidine in the above example, a dye compound is obtained which colors cellulose acetate textile materials red shades.

EXAMPLE 46

1.45 grams of 2-amino-5-nitrothiazole were diazotized and the diazonium compound obtained was coupled with 2.75 grams of N-CH₂CH₂COOCH₃-N-2,2,2-trifluoroethyl-m-toluidine. Diazotization, coupling and recovery of the dye compound formed were carried out in accordance with the general procedure described in Example 1. The dye compound obtained colors cellulose acetate textile materials red shades.

By the use of 2.89 grams of N-CH₂CH₂CH₂COOCH₃-N-2,2,2-trifluoroethyl-m-toluidine in the above example, a dye compound is obtained which colors cellulose acetate textile materials red shades.

EXAMPLE 47

1.45 grams of 2-amino-5-nitrothiazole were diazotized and the diazonium compound obtained was coupled with 2.71 grams of N-CH₂CH₂CH₂COOC₂H₅-N-2,2-difluoroethylaniline. Diazotization, coupling and recovery of the dye compound formed were carried out in accordance with the general procedure described in Example 1. The dye compound obtained colors cellulose acetate textile materials red shades.

By the use of 2.99 grams of

N-CH₂CH₂CH₂COOCH₂CH₂CH₃-N-
2,2-difluoroethyl-m-toluidine in the above example, a dye compound is obtained which colors cellulose acetate textile materials red shades.

EXAMPLE 48

1.45 grams of 2-amino-5-nitrothiazole were diazotized and the diazonium compound obtained was coupled with 2.13 grams of N-n-propyl-N-2,2-difluoroethyl-m-toluidine. Diazotization, coupling and recovery of the dye compound formed were carried out in accordance with the general procedure described in Example 1. The dye compound obtained colors cellulose acetate textile materials reddish-blue shades.

By the use of 2.13 grams of N-isopropyl-N-2,2-difluoro-n-propylaniline in the above example, a dye compound is obtained which colors cellulose acetate textile materials reddish-blue shades.

EXAMPLE 49

1.45 grams of 2-amino-5-nitrothiazole were diazotized and the diazonium compound obtained was coupled with 2.45 grams of N-n-butyl-N-2,2,2-trifluoroethyl-m-toluidine. Diazotization, coupling and recovery of the dye compound formed were carried out in accordance with the general procedure described in Example 1. The dye compound obtained colors cellulose acetate textile materials reddish-violet shades.

By the use of 2.59 grams of N-n-hexyl-N-2,2,2-trifluoroethylaniline in the above example, a dye compound is obtained which colors cellulose acetate textile materials reddish-violet shades.

EXAMPLE 50

1.45 grams of 2-amino-5-nitrothiazole were diazotized and the diazonium compound obtained was coupled with 2.97 grams of N-n-decyl-N-2,2-difluoroethylaniline. Diazotization, coupling and recovery of the dye compound formed were carried out in accordance with the general procedure described in Example 1. The dye compound obtained colors cellulose acetate textile materials reddish-blue shades.

By the use of 2.69 grams of N-n-octyl-N-2,2-difluoroethylaniline in the above example, a dye compound is obtained which colors cellulose acetate textile materials reddish-blue shades.

EXAMPLE 51

1.45 grams of 2-amino-5-nitrothiazole were diazotized and the diazonium compound obtained was coupled with 2.29 grams of N-$\beta$-methoxyethyl-N-2,2-difluoroethyl-m-toluidine. Diazotization, coupling and recovery of the dye compound formed were carried out in accordance with the general procedure described in Example 1. The dye compound obtained colors cellulose acetate textile materials reddish-blue shades.

By the use of 2.29 grams of N-$\beta$-ethoxyethyl-N-2,2-difluoroethylaniline in the above example, a dye compound is obtained which colors cellulose acetate textile materials reddish-blue shades.

EXAMPLE 52

1.45 grams of 2-amino-5-nitrothiazole were diazotized and the diazonium compound obtained was coupled with 2.57 grams of N-$\beta$-n-propoxyethyl-N-2,2-difluoroethyl-m-toluidine. Diazotization, coupling and recovery of the dye compound formed were carried out in accordance with the general procedure descibed in Example 1. The dye compound obtained colors cellulose acetate textile materials reddish-blue shades.

By the use of 2.57 grams of N-$\beta$-n-butoxyethyl-N-2,2-difluoroethylaniline in the above example, a dye compound is obtained which colors cellulose acetate textile materials reddish-blue shades.

EXAMPLE 53

1.45 grams of 2-amino-5-nitrothiazole were diazotized and the diazonium compound obtained was coupled with 2.47 grams of N-$\beta$-hydroxypropyl-N-2,2,2-trifluoroethyl-m-toluidine. Diazotization, coupling and recovery of the dye compound formed were carried out in accordance with the general procedure described in Example 1. The dye compound obtained colors cellulose acetate textile materials reddish-blue shades.

By the use of 2.47 grams of N-$\gamma$-hydroxypropyl-N-2,2,2-trifluoroethyl-m-toluidine in the above example, a dye compound is obtained which colors cellulose acetate textile materials reddish-blue shades.

EXAMPLE 54

1.45 grams of 2-amino-5-nitrothiazole were diazotized and the diazonium compound obtained was coupled with 2.45 grams of N-$\beta,\gamma$-dihydroxypropyl-N-2,2-difluoroethyl-m-toluidine. Diazotization, coupling and recovery of the dye compound formed were carried out in accordance with the general procedure described in Example 1. The dye compound obtained colors cellulose acetate textile materials reddish-blue shades.

By the use of 2.43 grams of N-$\delta$-hydroxybutyl-N-2,2-difluoroethyl-m-toluidine in the above example, a dye compound is obtained which colors cellulose acetate textile materials reddish-blue shades.

EXAMPLE 55

1.45 grams of 2-amino-5-nitrothiazole were diazotized and the diazonium compound obtained was coupled with 2.43 grams of N-$\epsilon$-hydroxyamyl-N-2,2-difluoroethylaniline. Diazotization, coupling and recovery of the dye compound formed were carried out in accordance with the general procedure described in Example 1. The dye compound obtained colors cellulose acetate textile materials reddish-blue shades.

EXAMPLE 56

1.45 of 2-amino-5-nitrothiazole were diazotized and the diazonium compound obtained was coupled with 2.10 grams of N-$\beta$-cyanoethyl-N-2,2-difluoroethylaniline. Diazotization, coupling and recovery of the dye compound formed were carried out in accordance with the general procedure described in Example 1. The dye compound obtained colors cellulose acetate textile materials red shades.

By the use of 2.38 grams of N-$\gamma$-cyanopropyl-N-2,2-difluoroethyl-m-toluidine in the above example, a dye compound is obtained which colors cellulose acetate textile materials red shades.

EXAMPLE 57

1.45 grams of 2-amino-5-nitrothiazole were diazotized and the diazonium compound obtained was coupled with 2.70 grams of N-$\delta$-cyanobutyl-N-2,2-trifluoroethyl-m-toluidine. Diazotization, coupling and recovery of the dye compound formed were carried out in accordance with the general procedure described in Example 1. The dye compound obtained colors cellulose acetate textile materials red shades.

By the use of 2.70 grams of N-$\epsilon$-cyanopentyl-N-2,2,2-trifluoroethylaniline in the above example, a dye compound is obtained which colors cellulose acetate textile materials red shades.

EXAMPLE 58

1.45 grams of 2-amino-5-nitrothiazole were diazotized and the diazonium compound obtained was coupled with 2.15 grams of N-$\beta$-hydroxyethyl-N-3,3-difluoropropylaniline. Diazotization, coupling and recovery of the dye compound formed were carried out in accordance with the general procedure described in Example 1. The dye compound obtained colors cellulose acetate textile materials reddish-blue shades.

By the use of 2.29 grams of N-$\beta$-hydroxyethyl-N-2,2-difluoro-n-propyl-m-toluidine in the above example, a dye compound is obtained which colors cellulose acetate textile materials bluish-red shades.

EXAMPLE 59

1.45 grams of 2-amino-5-nitrothiazole were diazotized and the diazonium compound obtained was coupled with 2.43 grams of N-$\beta$-hydroxyethyl-N-3,3-difluoro-n-butyl-m-toluidine. Diazotization, coupling and recovery of the dye compound formed were carried out in accordance with the general procedure described in Example 1. The dye compound obtained colors cellulose acetate textile materials blue shades.

By the use of 2.43 grams of N-$\beta$-hydroxyethyl-N-4,4-difluoro-n-amylaniline in the above example, a dye compound is obtained which colors cellulose acetate textile materials blue shades.

EXAMPLE 60

1.45 grams of 2-amino-5-nitrothiazole were diazotized and the diazonium compound obtained was coupled with 2.33 grams of N-$\beta$-hydroxyethyl-N-3,3,3-trifluoropropylaniline. Diazotization, coupling and recovery of the dye compound formed were carried out in accordance with the general procedure described in Example 1. The dye compound obtained colors cellulose acetate textile materials blue shades.

By the use of 2.61 grams of N-$\beta$-hydroxyethyl-N-4,4,4-trifluorobutyl-m-toluidine in the above example, a dye compound is obtained which colors cellulose acetate textile materials blue shades.

EXAMPLE 61

1.45 grams of 2-amino-5-nitrothiazole were diazotized and the diazonium compound obtained was coupled with 2.15 grams of N-$\beta$-hydroxyethyl-N-2,2-difluoroethyl-o-toluidine. Diazotization, coupling and recovery of the dye compound formed were carried out in accordance with the general procedure described in Example 1. The dye compound obtained colors cellulose acetate textile materials red shades.

By the use of 2.29 grams of N-β-hydroxyethyl-N-2,2-difluoroethyl-o-ethylaniline in the above example, a dye compound is obtained which colors cellulose acetate textile materials red shades.

EXAMPLE 62

1.45 grams of 2-amino-5-nitrothiazole were diazotized and the diazonium compound obtained was coupled with 2.31 grams of N-β-hydroxyethyl-N-2,2-difluoroethyl-o-methoxyaniline. Diazotization, coupling and recovery of the dye compound formed were carried out in accordance with the general procedure described in Example 1. The dye compound obtained colors cellulose acetate textile materials red shades.

By the use of 2.45 grams of N-β-hydroxyethyl-N-2,2-difluoroethyl-o-ethoxyaniline in the above example, a dye compound is obtained which colors cellulose acetate textile materials red shades.

EXAMPLE 63

1.45 grams of 2-amino-5-nitrothiazole were diazotized and the diazonium compound obtained was coupled with 2.54 grams of N-β-hydroxyethyl-N-2,2,2-trifluoroethyl-o-chloroaniline. Diazotization, coupling and recovery of the dye compound formed were carried out in accordance with the general procedure described in Example 1. The dye compound obtained colors cellulose acetate textile materials red shades.

By the use of 2.98 grams of N-β-hydroxyethyl-N-2,2,2-trifluoroethyl-o-bromoaniline in the above example, a dye compound is obtained which colors cellulose acetate textile materials red shades.

EXAMPLE 64

1.45 grams of 2-amino-5-nitrothiazole were diazotized and the diazonium compound obtained was coupled with 2.29 grams of N-β-hydroxyethyl-N-2,2-difluoroethyl-m-ethylaniline. Diazotization, coupling and recovery of the dye compound formed were carried out in accordance with the general procedure described in Example 1. The dye compound obtained colors cellulose acetate textile materials bluish-red shades.

By the use of 2.47 grams of N-β-hydroxyethyl-N-2,2,2-trifluoroethyl-m-ethylaniline in the above example, a dye compound is obtained which colors cellulose acetate textile materials reddish-violet shades.

EXAMPLE 65

1.45 grams of 2-amino-5-nitrothiazole were diazotized and the diazonium compound obtained was coupled with 2.31 grams of N-β-hydroxyethyl-N-2,2-difluoroethyl-m-methoxyaniline. Diazotization, coupling and recovery of the dye compound formed were carried out in accordance with the general procedure described in Example 1. The dye compound obtained colors cellulose acetate textile materials bluish-red shades.

By the use of 2.49 grams of N-β-hydroxyethyl-N-2,2,2-trifluoroethyl-m-methoxyaniline in the above example, a dye compound is obtained which colors cellulose acetate textile materials reddish-violet shades.

EXAMPLE 66

1.45 grams of 2-amino-5-nitrothiazole were diazotized and the diazonium compound obtained was coupled with 2.35 grams of N-β-hydroxyethyl-N-2,2-difluoroethyl-m-chloroaniline. Diazotization, coupling and recovery of the dye compound formed were carried out in accordance with the general procedure described in Example 1. The dye compound obtained colors cellulose acetate textile materials violet shades.

By the use of 2.53 grams of N-β-hydroxyethyl-N-2,2,2-trifluoroethyl-m-chloroaniline in the above example, a dye compound is obtained which colors cellulose acetate textile materials reddish-violet shades.

EXAMPLE 67

1.45 grams of 2-amino-5-nitrothiazole were diazotized and the diazonium compound obtained was coupled with 2.80 grams of N-β-hydroxyethyl-N-2,2-difluoroethyl-m-bromoaniline. Diazotization, coupling and recovery of the dye compound formed were carried out in accordance with the general procedure described in Example 1. The dye compound obtained colors cellulose acetate textile materials violet shades.

By the use of 2.98 grams of N-β-hydroxyethyl-N-2,2,2-trifluoroethyl-m-bromoaniline in the above example, a dye compound is obtained which colors cellulose acetate textile materials reddish-violet shades.

EXAMPLE 68

1.45 grams of 2-amino-5-nitrothiazole were diazotized and the diazonium compound obtained was coupled with 2.58 grams of N-β-hydroxyethyl-N-2,2-difluoroethyl-m-acetylaminoaniline. Diazotization, coupling and recovery of the dye compound formed were carried out in accordance with the general procedure described in Example 1. The dye compound obtained colors cellulose acetate textile materials blue shades.

By the use of 2.72 grams of N-β-hydroxyethyl-N-2,2-difluoroethyl-m-n-propionylaniline in the above example, a dye compound is obtained which colors cellulose acetate textile materials blue shades.

EXAMPLE 69

1.45 grams of 2-amino-5-nitrothiazole were diazotized and the diazonium compound obtained was coupled with 2.76 grams of N-β-hydroxyethyl-N-2,2,2-trifluoroethyl-m-acetylaminoaniline. Diazotization, coupling and recovery of the dye compound formed were carried out in accordance with the general procedure described in Example 1. The dye compound obtained colors cellulose acetate textile materials reddish-blue shades.

By the use of 2.90 grams of N-β-hydroxyethyl-N-2,2,2-trifluoroethyl-m-n-propionylaminoaniline in the above example, a dye compound is obtained which colors cellulose acetate textile materials reddish-blue shades.

EXAMPLE 70

1.45 grams of 2-amino-5-nitrothiazole were diazotized and the diazonium compound obtained was coupled with 2.86 grams of N-β-hydroxyethyl-N-2,2-difluoroethyl-m-n-butyrylaminoaniline. Diazotization, coupling and recovery of the dye compound formed were carried out in accordance with the general procedure described in Example 1. The dye compound obtained colors cellulose acetate textile materials blue shades.

By the use of 3.04 grams of N-β-hydroxyethyl-N-2,2,2-trifluoroethyl-m-n-butyrylaminoaniline in the above example, a dye compound is obtained which colors cellulose acetate textile materials reddish-blue shades.

EXAMPLE 71

1.45 grams of 2-amino-5-nitrothiazole were diazotized and the diazonium compound obtained was coupled with 2.61 grams of N-β-hydroxyethyl-N-2,2-difluoroethyl-2,5-dimethoxyaniline. Diazotization, coupling and recovery of the dye compound formed were carried out in accordance with the general procedure described in Example 1. The dye compound obtained colors cellulose acetate textile materials blue shades.

By the use of 2.79 grams of N-β-hydroxyethyl-N-2,2,2-trifluoroethyl-2,5-diethoxyaniline in the above example, a dye compound is obtained which colors cellulose acetate textile materials blue shades.

EXAMPLE 72

1.45 grams of 2-amino-5-nitrothiazole were diazotized and the diazonium compound obtained was coupled with 2.88 grams of N-β-hydroxyethyl-N-2,2-difluoroethyl-2-methoxy-5-acetylaminoaniline. Diazotization, coupling and recovery of the dye compound formed were carried out in accordance with the general procedure described in Example 1. The dye compound obtained colors cellulose acetate textile materials blue shades.

EXAMPLE 73

1.45 grams of 2-amino-5-nitrothiazole were diazotized and the diazonium compound obtained was coupled with 2.70 grams of N-β-hydroxyethyl-N-2,2-difluoroethyl-2,5-dichloroaniline. Diazotization, coupling and recovery of the dye compound formed were carried out in accordance with the general procedure described in Example 1. The dye compound obtained colors cellulose acetate textile materials red shades.

By the use of 3.59 grams of N-β-hydroxyethyl-N-2,2-difluoroethyl-2,5-dibromoaniline in the above example, a dye compound is obtained which colors cellulose acetate textile materials red shades.

EXAMPLE 74

1.45 grams of 2-amino-5-nitrothiazole were diazotized and the diazonium compound obtained was coupled with 2.84 grams of N-β-hydroxyethyl-N-2,2,2-trifluoroethyl-2-methoxy-5-chloroaniline. Diazotization, coupling and recovery of the dye compound formed were carried out in accordance with the general procedure described in Example 1. The dye compound obtained colors cellulose acetate textile materials reddish-blue shades.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color cellulose acetate. The diazotization, coupling and recovery operations are carried out in accordance with the procedure described hereinbefore.

TABLE I

[Diazo components: 2-amino-5-nitrothiazole and 2-amino-4-methyl-5-nitrothiazole]

| Coupling Component | Color |
|---|---|
| 1. N-n-butyl-N-2,2-difluoroethylaniline | reddish-blue. |
| 2. N-β-hydroxyethyl-N-2,2-difluoroethyl-m-ethylaniline | Do. |
| 3. N-β-hydroxyethyl-N-2,2-difluoroethyl-2-methoxy-5-methylaniline | blue. |
| 4. N-β-hydroxyethyl-N-2,2-difluoroethyl-2-ethoxy-5-acetylaminoaniline | Do. |
| 5. N-γ-hydroxypropyl-N-2,2-difluoroethyl-m-toluidine | reddish-blue. |
| 6. N-β,γ-dihydroxypropyl-N-2,2-difluoroethyl-m-ethylaniline | Do. |
| 7. N-β,γ-dihydroxypropyl-N-2,2-difluoroethyl-2-ethoxy-5-acetylaminoaniline | blue. |
| 8. N-β-hydroxyethyl-N-2,2-difluoro-n-propyl-m-chloroaniline | violet. |
| 9. N-β-hydroxyethyl-N-3,3-difluoropropyl-m-ethylaniline | reddish-blue. |
| 10. N-β-hydroxyethyl-N-3,3-difluoropropyl-2-methoxy-5-methylaniline | blue. |
| 11. N-β,γ-dihydroxypropyl-N-3,3-difluoropropyl-m-toluidine | Do. |
| 12. N-β,γ-dihydroxypropyl-N-3,3-difluoropropyl-m-chloroaniline | violet. |
| 13. N-β,γ-dihydroxypropyl-N-3,3-difluoropropyl-2-methoxy-5-methylaniline | blue. |
| 14. N-β-hydroxyethyl-N-3,3-difluoro-n-butyl-2-methoxy-5-methylaniline | Do. |
| 15. N-β,γ-dihydroxypropyl-N-3,3-difluoro-n-butylaniline | Do. |
| 16. N-β-hydroxyethyl-N-2,2,2-trifluoroethyl-m-chloroaniline | red. |
| 17. N-β-hydroxyethyl-N-3,3,3-trifluoropropyl-aniline | red-violet. |

The dyes obtained employing 2-amino-4-methyl-5-nitrothiazole yield somewhat redder shades than the corresponding dyes obtained when 2-amino-5-nitrothiazole is employed.

TABLE II

[Diazo components: 2-amino-4-trifluoromethyl-5-nitrothiazole and 2-amino-4-cyano-5-nitrothiazole]

| Coupling Component | Color |
|---|---|
| 1. N-n-butyl-N-2,2-difluoroethylaniline | reddish-blue. |
| 2. N-β-hydroxyethyl-N-2,2-difluoroethyl-m-ethylaniline | Do. |
| 3. N-β-hydroxyethyl-N-2,2-difluoroethyl-2-methoxy-5-methylaniline | Do. |
| 4. N-β-hydroxyethyl-N-2,2-difluoroethyl-2-ethoxy-5-acetylaminoaniline | blue. |
| 5. N-γ-hydroxypropyl-N-2,2-difluoroethyl-m-toluidine | reddish-blue. |
| 6. N-β,γ-dihydroxypropyl-N-2,2-difluoroethyl-m-ethylaniline | Do. |
| 7. N-β,γ-dihydroxypropyl-N-2,2-difluoroethyl-2-ethoxy-5-acetylaminoaniline | blue. |
| 8. N-β-hydroxyethyl-N-2,2-di, fluoro-n-propyl-m-chloroaniline | violet. |
| 9. N-β-hydroxyethyl-N-3,3-difluoropropyl-m-ethylaniline | reddish-blue. |
| 10. N-β-hydroxyethyl-N-3,3-difluoropropyl-2-methoxy-5-methylaniline | blue. |
| 11. N-β,γ-dihydroxypropyl-N-3,3-difluoropropyl-m-toluidine | Do. |
| 12. N-β,γ-dihydroxypropyl-N-3,3-difluoropropyl-m-chloroaniline | violet. |
| 13. N-β,γ-dihydroxypropyl-N-3,3-difluoropropyl-2-methoxy-5-methylaniline | blue. |
| 14. N-β-hydroxyethyl-N-3,3-difluoro-n-butyl-2-methoxy-5-methylaniline | Do. |
| 15. N-β,γ-dihydroxypropyl-N-3,3-difluoro-n-butylaniline | Do. |
| 16. N-β-hydroxyethyl-N-2,2,2-trifluoroethyl-m-chloroaniline | violet. |
| 17. N-β-hydroxyethyl-N-3,3,3-trifluoropropylaniline | reddish-blue. |
| 18. N-β-methyl-β,γ-dihydroxypropyl-N-2,2-difluoroethylaniline | Do. |

TABLE III

[Diazo components: 2-amino-4-phenyl-5-nitrothiazole, 2-amino-4-(m-nitrophenyl)-5-nitrothiazole and 2-amino-5-(p-nitrophenyl)-5-nitrothiazole]

| Coupling Component | Color |
|---|---|
| 1. N-n-butyl-N-2,2-difluoroethylaniline | reddish-blue. |
| 2. N-β-hydroxyethyl-N-2,2-difluoroethyl-m-ethylaniline | Do. |
| 3. N-β-hydroxyethyl-N-2,2-difluoroethyl-2-methoxy-5-methylaniline | blue. |
| 4. N-β-hydroxyethyl-N-2,2-difluoroethyl-2-ethoxy-5-acetylaminoaniline | Do. |
| 5. N-γ-hydroxypropyl-N-2,2-difluoroethyl-m-toluidine | reddish-blue. |
| 6. N-β,γ-dihydroxypropyl-N-2,2-difluoroethyl-m-ethylaniline | Do. |
| 7. N-β,γ-dihydroxypropyl-N-2,2-difluoroethyl-2-ethoxy-5-acetylaminoaniline | blue. |
| 8. N-β-hydroxyethyl-N-2,2-difluoro-n-propyl-m-chloroaniline | reddish-blue. |
| 9. N-β-hydroxyethyl-N-3,3-difluoropropyl-m-ethylaniline | blue. |
| 10. N-β-hydroxyethyl-N-3,3-difluoropropyl-2-methoxy-5-methylaniline | Do. |
| 11. N-β,γ-dihydroxypropyl-N-3,3-difluoropropyl-m-toluidine | Do. |
| 12. N-β,γ-dihydroxypropyl-N-3,3-difluoropropyl-m-chloroaniline | Do. |
| 13. N-β,γ-dihydroxypropyl-N-3,3-difluoropropyl-2-methoxy-5-methylaniline | Do. |
| 14. N-β-hydroxyethyl-N-3,3-difluoro-n-butyl-2-methoxy-5-methylaniline | Do. |
| 15. N-β,γ-dihydroxypropyl-N-3,3-difluoro-n-butylaniline | Do. |
| 16. N-β-hydroxyethyl-N-2,2,2-trifluoroethyl-m-chloroaniline | violet. |
| 17. N-β-hydroxyethyl-N-3,3,3-trifluoropropyl-aniline | reddish-blue. |
| 18. N-β-methyl-β,γ-dihydroxypropyl-N-2,2,2-trifluoroethyl-m-toluidine | violet. |

The sulfatoalkyl, the sulfoalkyl, the phosphatoalkyl and the phosphonoalkyl groups which may be present in our new dye compounds can be present in their free acid form or any suitable salt form such as, for example, the Na, K, NH$_4$, Mg, Ca or Li salt form.

In order that the preparation of the azo compounds of our invention may be entirely clear the preparation of certain intermediates used in their manufacture is described hereinafter.

2-amino-4-phenylthiazole 160 grams of bromine were added dropwise, with stirring, to a slurry of 120 grams of acetophenone and 152 grams of thiourea in a suitable reaction vessel. Heat was evolved and stirring became difficult.

The reaction mixture was heated on a steam bath overnight after which 2.5 liters of hot water (85° C.) were added. The reaction mixture was stirred to effect solution and then filtered while hot. On cooling, the hydrobromide salt of 2-amino-4-phenylthiazole crystallized. Then concentrated ammonium hydroxide was added to the cold reaction mixture until it become slightly alkaline. The reaction mixture was filtered and the 2-amino-4-phenylthiazole collected on the filter was washed once with water and dried. A yield of 126 grams was thus obtained. Upon recrystallization from ethyl alcohol 2-amino-4-phenylthiazole melting at 144° C.–146° C. was obtained.

2-amino-4-(m-nitrophenyl)thiazole 160 grams of bromine were added dropwise, with stirring, to a mixture of 165 grams of m-nitroacetophenone and 152 grams of thiourea in a suitable reaction vessel. Toward the end of the bromine addition the reaction mixture became a slurry.

After heating on a steam bath overnight, the reaction product was dissolved by pouring the reaction mixture into 4 liters of hot water and the resulting solution was filtered while hot. Upon cooling the hydrobromide salt of 2-amino-4-(m-nitrophenyl) thiazole crystallized. Then concentrated ammonium hydroxide was added to the cold reaction mixture until it became slightly alkaline. The reaction mixture was filtered and the 2-amino-4-(m-nitrophenyl)thiazole collected on the filter was washed once with water and dried. The yield of crude product was 87% of the theory. Upon recrystallization twice from ethyl alcohol 2-amino-4-(m-nitrophenyl)-thiazole melting at 178° C.–180° C. was obtained.

2-amino-4-(m-nitrophenyl)-5-nitrothiazole 60 grams of 2-amino-4-(m-nitrophenyl)thiazole were dissolved at 15° C. in 300 cc. of H₂SO₄. 13.3 cc. of fuming nitric acid (90%, density 1.5, 5% excess) were added at 10° C.–15° C. and the reaction mixture was allowed to stand overnight. Then the reaction mixture was stirred into ice and the reaction product filtered off. The reaction product was slurried with sodium bicarbonate until neutral and then with water. Upon recrystallization from nitrobenzene the 2-amino-4-(m-nitrophenyl)-5-nitrothiazole reaction product melted at 236–237° C.

2-acetamido-4-phenylthiazole 15 grams of 2-amino-4-phenylthiazole were heated on a steam bath with 50 cc. of acetic anhydride. Solution first occurred and then the reaction product precipitated. The reaction mixture was cooled, poured into water and stirred until excess acetic anhydride had reacted. Then the reaction mixture was filtered and the 2-acetamido-4-phenylthiazole collected on the filter was dried. Upon recrystallization from ethyl alcohol it melted at 206° C.–208° C.

2-amino-4-phenyl-5-nitrothiazole

The 2-acetamido-4-phenylthiazole prepared as described above was nitrated in sulfuric acid with fuming nitric acid in accordance with the procedure described in connection with 2-amino-4-(m-nitrophenyl)-5-nitrothiazole. Upon recrystallization from an acetic acid-water mixture the 2-acetamido-4-phenyl-5-nitrothiazole reaction product melted at 215° C.–224° C. 7 grams of the acetamido reaction product were hydrolyzed to the amino compound using 45 cc. of HCl, 90 cc. of H₂O and 90 cc. of acetic acid. The 2-amino-4-phenyl-5-nitrothiazole thus obtained was recrystallized from nitrobenzene. The purified product sintered and darkened at 245° C. and decomposed at 260° C.

2-amino-4-trifluoromethylthiazole 14 grams of 1-chloro-3,3,3-trifluoropropanone-2 and 7.26 grams of thiourea in 50 cc. of water were heated together on a steam bath for four hours. After cooling, the reaction mixture was made slightly basic with sodium carbonate. A yellow precipitate of 2-amino-4-trifluoromethylthiazole formed and was recovered by filtration and dried. 9.1 grams of product melting at 58° C.–60° C. were obtained.

*Analysis.*—Calculated for $C_4H_3F_3N_2S$.—C, 28.57; H, 1.79; N, 16.67; S, 19.07. Found.—C, 29.22; H, 1.95; N, 16.70; S, 19.28.

2-amino-4-trifluoromethyl-5-nitrothiazole

This compound is prepared by nitrating 2-amino-4-trifluoromethylthiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-trifluoromethyl-5-nitrothiazole is filtered off, washed with water and dried.

2-amino-4-cyanothiazole

This compound is prepared by reacting equal molar quantities of thiourea and bromopyruvonitrile in ethyl alcohol.

2-amino-4-cyano-5-nitrothiazole

This compound is prepared by nitrating 2-amino-4-cyanothiazole at 5° C.–10° C. in sulfuric acid with fuming nitric acid and allowing the reaction mixture to warm to room temperature overnight. The reaction mixture is then drowned on ice, neutralized with sodium carbonate and the precipitated 2-amino-4-cyano-5-nitrothiazole is filtered off, washed with water and dried.

2-amino-4-methylthiazole

This compound melting at 44° C.–45° C. is obtained in a 70–75% yield by reacting thiourea and chloroacetone together in accordance with the procedure described by Byers and Dickey in Organic Syntheses, Collective Volume 2, page (1943).

2-amino-4-alkylthiazole compounds having the general formula:

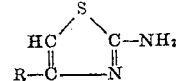

wherein R represents an alkyl group having 1 to 6, inclusive, carbon atoms are prepared by reacting thiourea with a ketone having the formula:

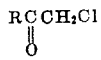

wherein R represents an alkyl group having 1 to 6, inclusive, carbon atoms. The reaction is carried out in accordance with the procedure used in preparing 2-amino-4-methylthiazole.

Compounds having the formula:

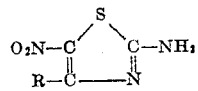

wherein R represents an alkyl group having 1 to 6, inclusive, carbon atoms are prepared by nitrating the corresponding unnitrated compound with fuming nitric acid in sulfuric acid at a temperature of about 5° C. The reaction is carried out using the general procedure described in connection with the preparation of 2-amino-4-trifluoromethyl-5-nitrothiazole.

2-amino-4-phenyl-5-nitrothiazole and 2-amino-4-(m-nitrophenyl)-5-nitrothiazole also can be prepared by the procedures referred to in Chapter 8 of Organic Reactions, volume VI, published by John Wiley and Sons, Inc. (e. g. see pages 380 and 398). The procedures described or indicated herein are used in the perparation of the other 2-amino-4-substituted phenyl-5-nitrothiazole compounds referred to herein.

The azo dye compounds of our invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:

1. The azo compounds having the general formula:

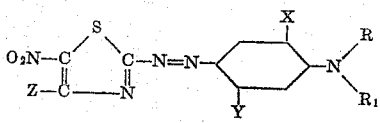

wherein R represents a member selected from the group consisting of a hydrogen atom, an alkyl group having 1 to 10, inclusive, carbon atoms, an alkoxyalkyl group having 3 to 6, inclusive, carbon atoms, a hydroxyalkyl group having 2 to 5, inclusive, carbon atoms, a cyanoalkyl group having 2 to 6, inclusive, carbon atoms, a sulfoalkyl group having 2 to 4, inclusive, carbon atoms, a sulfatoalkyl group having 2 to 5, inclusive, carbon atoms, a phosphatoalkyl group having 2 to 5, inclusive, carbon atoms, a phosphonoalkyl group having 2 to 5, inclusive, carbon atoms and a $(-CH_2)_n-COOR_2$ group wherein $n$ is a whole number selected from 1, 2 and 3 and $R_2$ represents an alkyl group having 1 to 4, inclusive, carbon atoms, $R_1$ represents a member selected from the group consisting of a 2,2-difluoroethyl group, a 3,3-difluoropropyl group, a 2,2-difluoro-n-propyl group, a 3,3-difluoro-n-butyl group, a 4,4-difluoro-n-amyl group, a 2,2,2-trifluoroethyl group, a 3,3,3-trifluoropropyl group and a 4,4,4-trifluorobutyl group, X represents a member selected from the group consisting of a hydrogen atom, an alkyl group having 1 to 2, inclusive, carbon atoms, an alkoxy group having 1 to 2, inclusive, carbon atoms, a bromine atom and a chlorine atom, Y represents a member selected from the group consisting of a hydrogen atom, an alkyl group having 1 to 2, inclusive, carbon atoms, an alkoxy group having 1 to 2, inclusive, carbon atoms, a bromine atom, a chlorine atom, an acetylamino group, a propionyl amino group and a butyrylamino group and Z represents a member selected from the group consisting of a hydrogen atom, an unsubstituted alkyl group having 1 to 6, inclusive, carbon atoms, a cyano group, a trifluoromethyl group and a

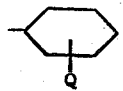

group, wherein Q represents a member selected from the group consisting of a hydrogen atom, a nitro group, a chlorine atom, a bromine atom, a fluorine atom and an alkyl group having 1 to 4, inclusive, carbon atoms.

2. The azo compounds having the general formula:

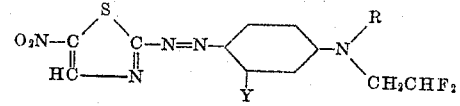

wherein R represents a hydroxyalkyl group having 2 to 5, inclusive, carbon atoms and Y represents an alkyl group having 1 to 2, inclusive, carbon atoms.

3. The azo compounds having the general formula:

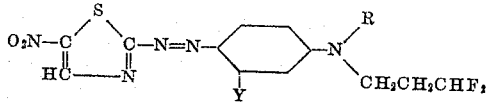

wherein R represents a hydroxyalkyl group having 2 to 5, inclusive, carbon atoms and Y represents an alkyl group having 1 to 2, inclusive, carbon atoms.

4. The azo compounds having the general formula:

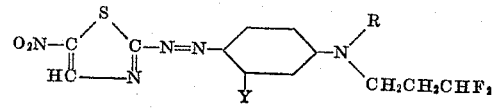

wherein R represents a hydroxyalkyl group having 2 to 5, inclusive, carbon atoms and Y represents a halogen atom having an atomic weight of from 19 to 80.

5. The azo compound having the formula:

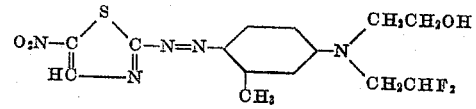

6. The azo compound having the formula:

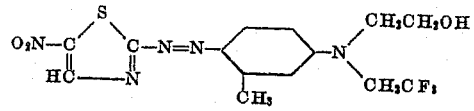

7. The azo compound having the formula:

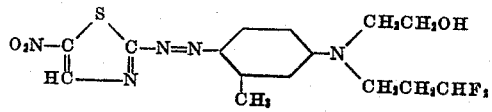

8. The azo compound having the formula:

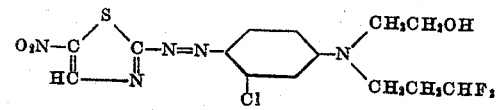

9. The azo compound having the formula:

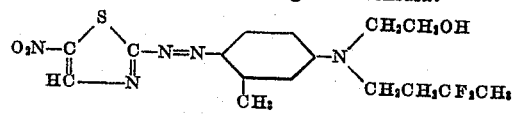

References Cited in the file of this patent

UNITED STATES PATENTS

| 2,516,302 | Dickey | July 25, 1950 |
| 2,516,303 | Dickey | July 25, 1950 |

FOREIGN PATENTS

| 35,296 | Netherlands | Apr. 15, 1935 |